Inventor
Bernhard Bischof
Attorneys

March 2, 1937. B. BISCHOF 2,072,291

VALVE GEAR FOR INTERNAL COMBUSTION ENGINES

Filed Aug. 22, 1935 4 Sheets-Sheet 2

March 2, 1937. B. BISCHOF 2,072,291

VALVE GEAR FOR INTERNAL COMBUSTION ENGINES

Filed Aug. 22, 1935 4 Sheets-Sheet 3

Inventor
Bernhard Bischof
By
Attorneys

March 2, 1937.  B. BISCHOF  2,072,291
VALVE GEAR FOR INTERNAL COMBUSTION ENGINES
Filed Aug. 22, 1935    4 Sheets-Sheet 4
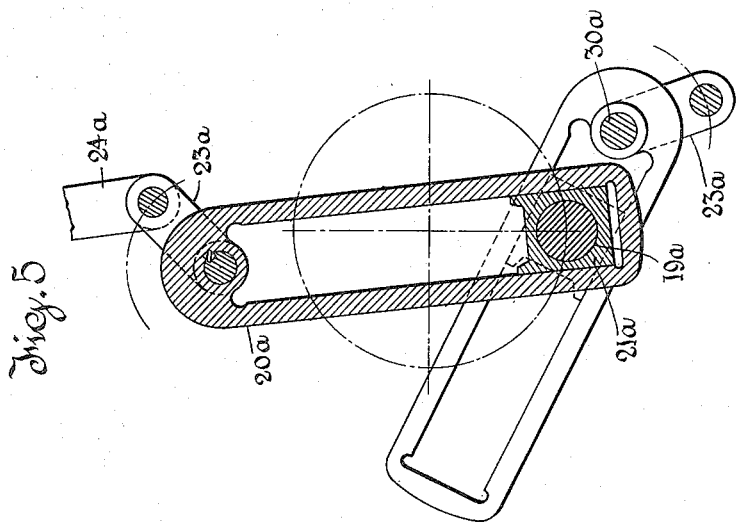
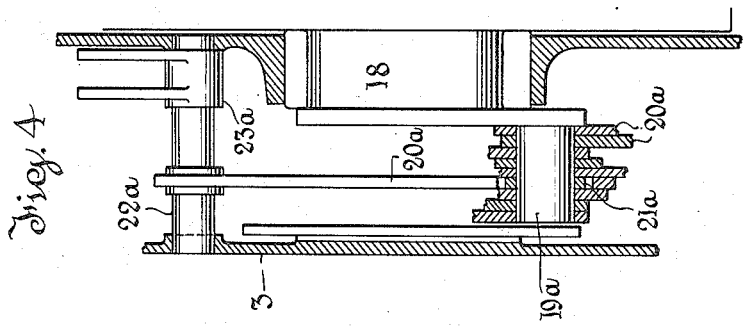
Inventor
Bernhard Bischof
By
Dodge aid Sons
Attorneys Patented Mar. 2, 1937

2,072,291

UNITED STATES PATENT OFFICE 2,072,291

VALVE GEAR FOR INTERNAL COMBUSTION ENGINES

Bernhard Bischof, Winterthur, Switzerland

Application August 22, 1935, Serial No. 37,405
In Switzerland August 24, 1934

11 Claims. (Cl. 123—65)

This invention relates to a valve gear for two cycle internal combustion engines wherein a cylindrical slide valve (sleeve valve), which is arranged between the working piston and the cylinder bore, controls inlet and outlet ports provided at opposite ends of the cylinder.

Two cycle internal combustion engines having a sleeve valve gear, wherein the drive for the valve sleeve is derived from the motion of the piston, are known. The drive is taken from a point on the connecting rod of the working piston which describes an approximately elliptical curve and closely approaches the mechanism which causes the slide valve motion. However, such a drive, derived from the connecting rod of the working piston, cannot be used for all types of internal combustion engines. For example, so-called radial engines, which have a large number of cylinders for each working crank, cannot be provided with a valve gear of the said type because sufficient clearance between the piston connecting rods to accommodate such a drive cannot be had.

The present invention has for its object to produce a slide valve gear of the above type which is adapted especially for radial engines, but may be used for other types, and permits in such engines first the opening of the exhaust ports, then the opening of the inlet ports provided at the other end of the cylinder, thereupon the closing of the exhaust ports and finally the closing of the inlet ports. The particular timing is a matter of design. However, the drive of the sleeve valve is not derived, as heretofore, from the piston connecting rod. The gear according to the present invention has a special crank pin, from which the drive of the cylindrical slide valve is derived and which describes a circular path about the crank shaft axis. A lever is connected to the said crank pin and oscillates about an axis of rotation, which lies outside the path of the special crank pin and from which axis the motion for the sleeve valve is derived.

In the accompanying drawings practical embodiments of the invention are shown by way of example.

Figure 1:
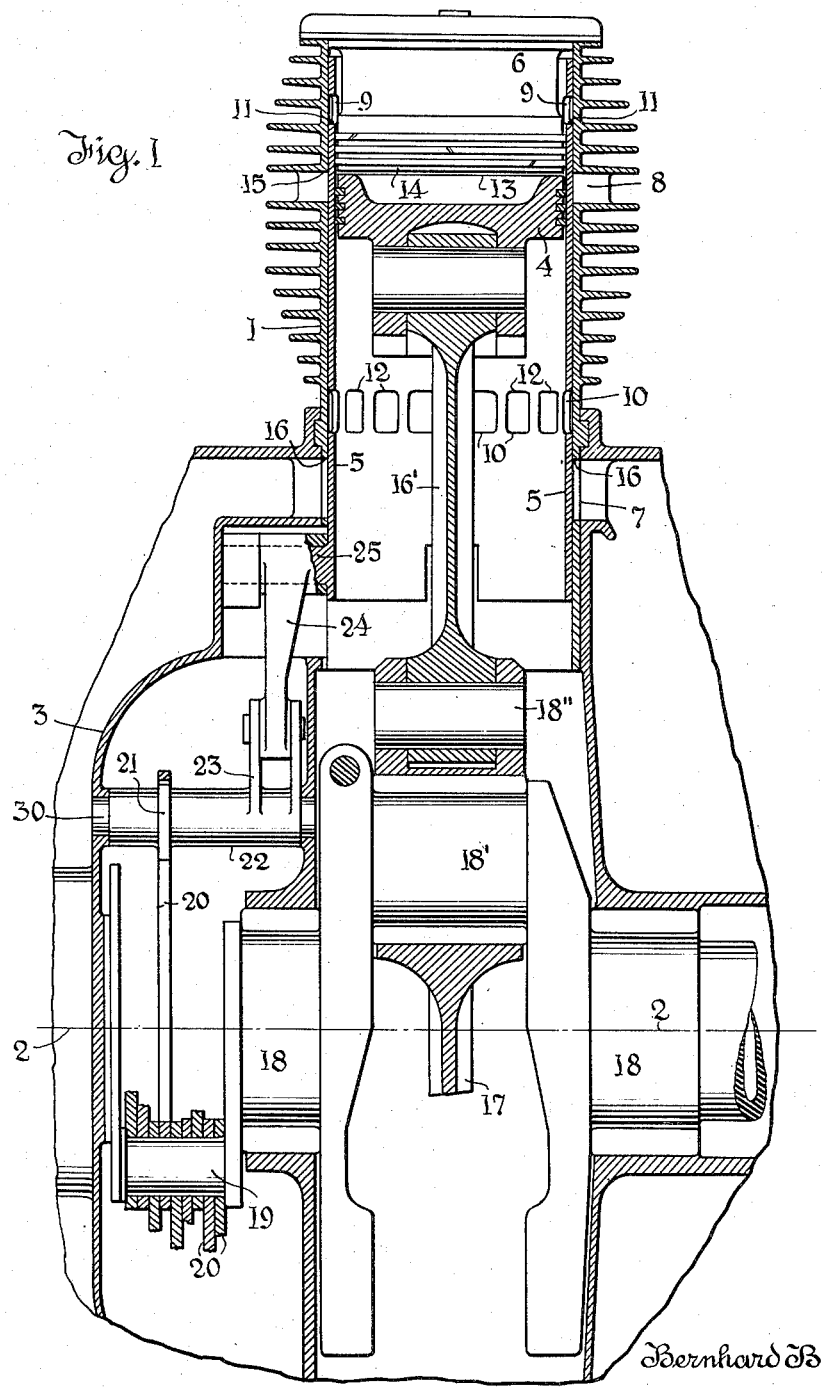

Fig. 1 is a fragmentary section on the axis of one cylinder of a nine cylinder radial internal combustion sleeve valve engine equipped with the improved valve gear. The main crank is shown on the head end dead point for the cylinder illustrated, and the special crank which actuates the valve gear is drawn as if it were spaced 180° from the main crank.

Figure 2:
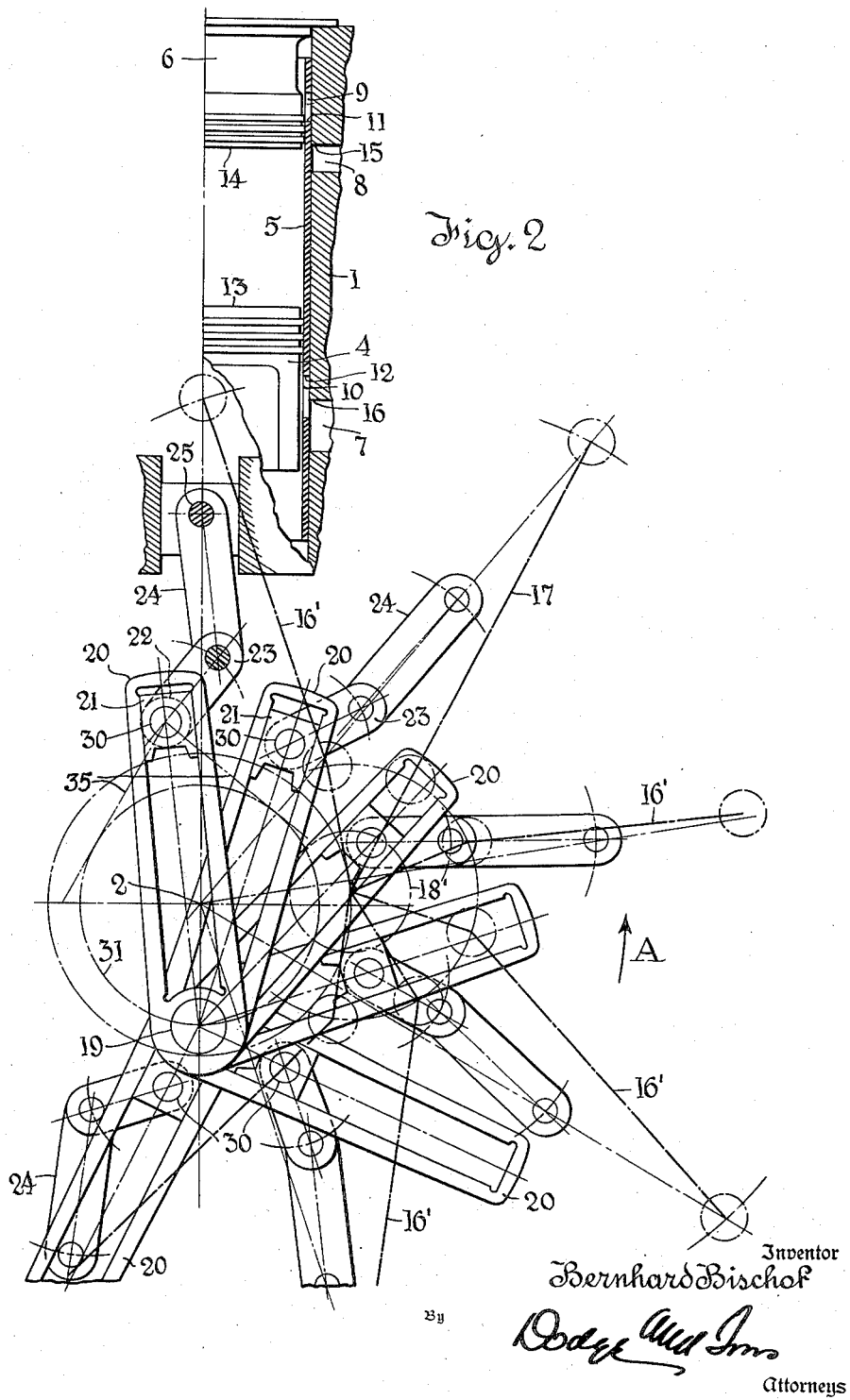

Fig. 2 is a fragmentary diagrammatic view of a portion of the engine shown in Fig. 1. The view illustrates piston and valve positions for a series of four of the nine cylinders. The top cylinder and its sleeve valve are shown in fragmentary axial section with the piston in elevation. For the other cylinders only the center line and wrist pin positions are indicated, the related valve linkage for each such cylinder being shown in full lines.

Figure 3:
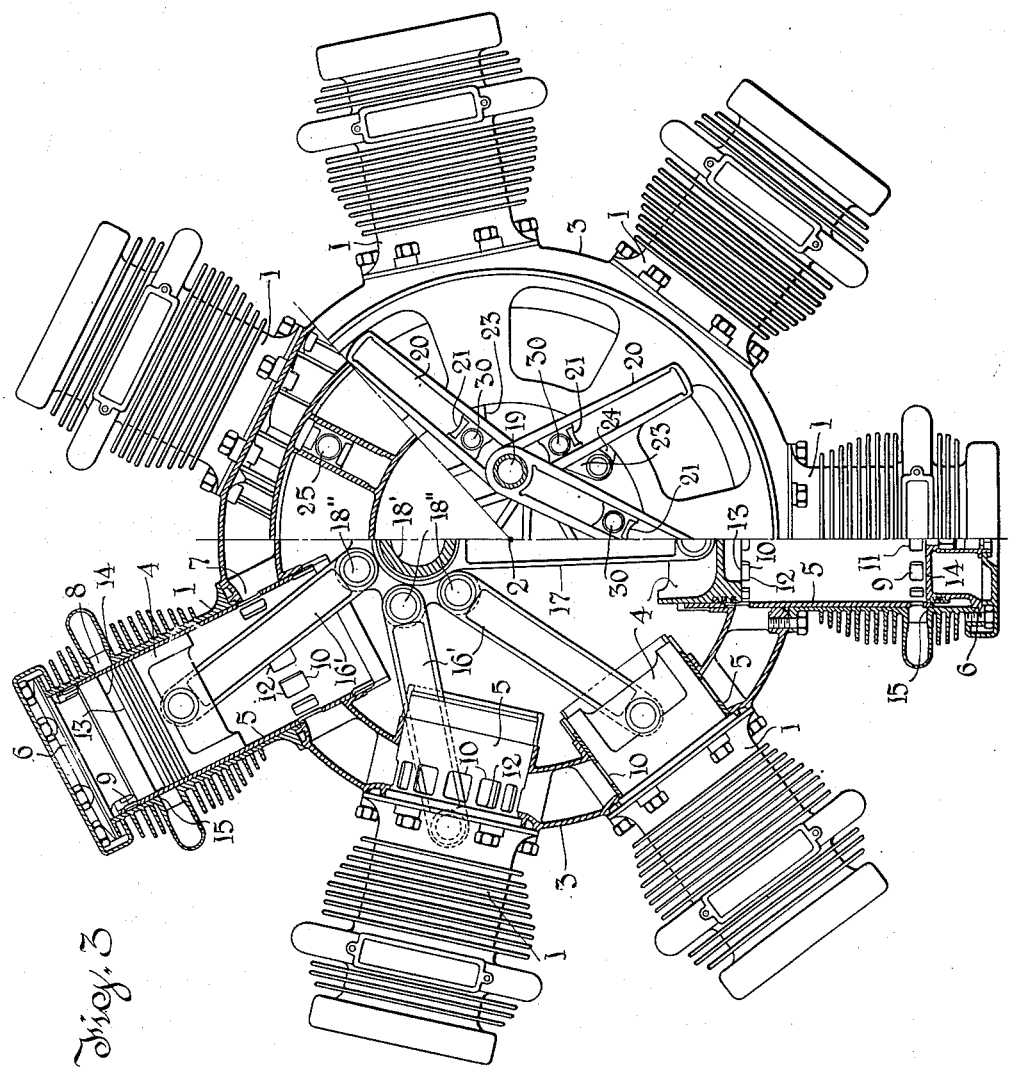

Fig. 3 shows a seven cylinder engine equipped with the same valve gear. The left hand portion of this figure is partially sectioned or broken away to show the arrangement of the pistons and connecting rods. The right hand portion of the figure is broken away on two planes and shows, in the lower part of the view, the swinging arms operated by the special crank, and in the upper part the drive connection to the valve sleeve for one cylinder.

Figs. 4 and 5, respectively, are fragmentary views similar to portions of Figs. 1 and 2, but showing a modified construction of the lever mechanism which derives motion from the special crank.

Refer particularly to Figs. 1 and 2.

1 indicates the working cylinders of the radial engine, which are arranged in a plane perpendicular to the axis 2 of the crank shaft 18. 3 indicates the casing of the radial engine. Each cylinder 1 has a reciprocating piston 4 which works in a cylindrical sleeve valve 5. Each sleeve valve 5 is interposed between the piston 4 and the bore of the corresponding cylinder 1. The cylinder is closed by a cylinder head 6 at the end which is remote from the crank shaft 18. It has a portion which extends into the outer end of the cylinder and the sleeve valve. Each cylinder 1 has two rows of ports 7, 8, which are provided near opposite ends of the cylinder. The ports 7 which are closer to the crank shaft 18 serve as inlet ports while the ports 8 serve as exhaust ports.

The ports 7 and 8 are controlled by rows of ports 9 and 10 arranged in the sleeve valve 5, near opposite ends of the latter. The row of ports 9 controls the exhaust ports 8 of the cylinder 1, and the row of ports 10 controls the inlet ports 7 of such cylinder. With regard to the controlling edges of the ports of the sleeve valve 5, the edge 11 (Fig. 2) is the controlling edge for the exhaust and the edge 12 is the controlling edge for the inlet. The controlling edge 12 of the slide valve ports 10 is adapted to cooperate with the upper edge 13 of the piston 4, while the controlling edge 11 of the outlet ports 9 is adapted to cooperate with the lower edge 14 of the inwardly extending portion of the cylinder head 6 and the upper edge 15 (Fig. 2) of the exhaust ports 8 in the cylinder 1. However, the controlling of the inlet could also be effected by the overlapping of the edge 16 of the inlet ports 7 in the cylinder 1 by the lower edge of the row of ports 10 in the cylindrical slide valve 5.

The combustion pressure acting on the working piston 4 of all except one of the cylinders is transmitted by a connecting rod 16' through a pin 18'' to a main connecting rod 17 which is guided in the known manner by being connected with the remaining one of the working pistons. This is a familiar construction in radial engines and will be discussed hereafter with reference to Fig. 3. The main connecting rod 17 transmits the forces acting thereon to the crank pin 18' of the crank shaft 18 which rotates on the axis 2, being supported in bearings in housing 3, as usual. A special crank pin 19 is provided on the end of the crank shaft 18 and there are as many arms 20 journaled on the said pin as there are cylinders in the radial engine, (thus for the engine illustrated in Figs. 1 and 2 there are nine such arms). Each arm 20 is longitudinally slotted and embraces a block 21 (see especially Fig. 2) which is rigidly secured to a corresponding hollow shaft 22. Each shaft 22 is journaled on a corresponding fixed axis 30 and carries an oscillating lever 23 bifurcated at its outer end. A connecting link 24 pinned to the corresponding sleeve valve 5 at 25 is also pinned to the end of lever 23. Hence, the rocking of shaft 22 caused by the rotation of special crank pin 19, produces reciprocation of valve sleeve 5.

In Fig. 1 the special pin 19 is shown displaced 180° from the crank pin 18', but actually as indicated in Figs. 2 and 3, the angle of lead of the pin 19 relatively to the crank pin 18' is approximately 90°. This angle of lead may be greater or smaller than 90°, according to the desired timing.

The above described slide valve gear operates in the following manner: When the motor rotates in the direction of the arrow A indicated in figure 2, the valve actuating crank pin 19 describes a circular path 31 (Fig. 2) which is in close proximity to the fixed axes 30. These axes 30 are arranged in a circle around the axis of rotation 2 of the crank shaft 18. Each arm 20 slides to and fro on the block 21 associated therewith; an oscillating motion about axis 30 is imparted to the block 21 and consequently to the related lever 23 rigid therewith. This oscillating motion is transmitted to the corresponding link 24 and hence to the related valve 5. The closer the pin 19 approaches an axis of rotation 30, the greater will be the angular velocity of the lever 23 rotatably mounted on the said axis. When the special crank pin 19 is removed from an axis of rotation 30, the deflection of lever 23 will be smaller relatively to an angle through which the pin moves. Consequently, the arrangement is so selected relatively to the position of the axis 30 and the pin 19 that the latter comes closer to the axis 30 when the exhaust ports 8 are opened by the row of ports 9. It is thus possible to increase the speed of the cylindrical slide valve 5 with respect to the speed of the piston 4 during the opening of the exhaust ports 8. However, as soon as the pin 19 is removed from the axis of rotation 30, the motion of the lever 23 will be smaller so that the speed of the slide valve also decreases. At the moment when the line 35 (Fig. 2), which extends through the axis 30 and the center of the pin 19, is tangent to the path 31 described by the pin 19, the motion of the slide valve will be zero. It is obvious that it is possible with a small crank angle to effect the opening and closing of the two rows of ports 7, 8, and owing to the speed of the slide valve increasing relatively to the speed of the working piston, large port areas are possible. Hence, the above described valve gear is particularly adapted for high speed engines. The entire stroke of the sleeve valve 5 can be made as small as one fourth to one fifth of the stroke of the piston 4. The substantial acceleration forces and retardation forces required for the movement of the sleeve valve 5 are chiefly delivered by the related piston 4 because this piston moves in the same direction as the associated slide valve 5. Hence, the frictional forces produced by the working piston 4 moving in the slide valve 5 can be used for the acceleration and retardation of the cylindrical slide valve 5.

It is possible, according to the position of the axis of rotation 30, and according to the angle of lead between pin 19 and crank pin 18, to combine the opening of the exhaust ports 7 with the highest speed of the cylindrical sleeve valve 5 and to effect the closure of the inlet ports 1 after the closure of the exhaust ports 8.

The above-described slide valve gear may also be used in motors, the cylinders of which are in V arrangement, fan arrangement or the like.

Fig. 3 shows a seven cylinder engine. Since all the pistons are operated from the same crank, and since all the valve mechanisms are operated from another single crank, the timing of events is dependent on the angular spacing of the radially arranged cylinders. Hence the mechanism for any given cylinder is the same irrespective of the number of cylinders. The only difference is the number of such mechanisms required. A seven cylinder engine was chosen for Fig. 3 because it could be drawn on a larger scale than could a nine cylinder engine. In this figure, since the valve mechanisms are each identical with those shown in Figs. 1 and 2, the same reference numerals are used. Figure 3 shows clearly the main connecting rod 17 for the bottom cylinder, and the secondary connecting rods 16' for the other cylinders, such rods being connected to the crank end of the main rod 17, as above described. This is a conventional arrangement in radial engines.

Figs. 4 and 5 show a modified construction involving a reversal of the swinging arm and sliding block arrangement. Here block 21a is journaled on special crank 19a and works in the slot in arm 20a which is fast on hollow shaft 22a. Arm 23a is fast to shaft 22a. The motion is the same in both cases and the two arrangements are equivalent.

What is claimed is:—

1. The combination with a two cycle internal combustion engine comprising cylinder, piston, interposed valve sleeve, crank shaft and a driving connection between said crank shaft and piston, of driving means for the valve sleeve comprising a crank pin revolving with the crank shaft; a member mounted to rock on a fixed axis outside the orbit of said pin; driving connections between the said rocking member and valve sleeve whereby rocking of this member causes reciprocation of the sleeve; and a sliding block and lever connection between said pin and member whereby rotation of the shaft causes rocking of the member.

2. The combination defined in claim 1 in which the crank pin which drives the valve sleeve is mounted on the end of the crank shaft.

3. The combination defined in claim 1 in which the crank pin which drives the valve sleeve leads the crank connected with the piston, in the direction of rotation.

4. The combination defined in claim 1 in which the pin which drives the valve sleeve is angularly displaced from the crank connected with the piston by approximately 90°.

5. The combination defined in claim 1 in which the valve sleeve controls exhaust ports, and the parts are so constructed that said ports are open when the pin which drives the valve sleeve is adjacent the fixed axis on which the rocking member is mounted.

6. The combination defined in claim 1 in which a plurality of cylinders with valve sleeves and pistons are radially arranged about the crank shaft with their axes substantially in a common plane, and a single pin on the crank shaft drives all the valve sleeves in timed relation through driving connections of the type defined, one for each cylinder.

7. The combination defined in claim 1, in which the parts are so arranged that the directions of reciprocatory motion of the valve sleeve approximately coincide with the directions of reciprocatory motion of the piston and the piston has the longer path of reciprocation whereby friction between the piston and sleeve assists in moving the sleeve.

8. The combination defined in claim 1, in which a plurality of cylinders with valve sleeves and pistons are radially arranged about the crank shaft, with their axes substantially in a common plane, and a single pivot on the crank shaft drives all the valve sleeves in timed relation through corresponding rocking members and associated driving connections and imparts to each sleeve a complete, practically rectilinear reciprocation during a single rotation of the crank shaft.

9. The combination in a two cycle internal combustion engine of a cylinder; a piston; a reciprocable valve sleeve interposed between said cylinder and piston; a crank shaft; driving connections between said shaft and said piston; a pivot pin displaced from the axis of the crank shaft and revolving with said shaft; a member driven by said pin and arranged to swing about an axis fixed relatively to said cylinder and outside the orbit of said pivot, but close thereto, whereby said member is caused to swing with varying angular velocity as the crank shaft rotates uniformly; and driving connections between said swinging member and said valve sleeve.

10. The combination in a two cycle internal combustion engine of a cylinder; a piston; a reciprocable valve sleeve interposed between said cylinder and piston and controlling inlet and exhaust ports at opposite ends of the working space formed by said cylinder and piston; a crank shaft; driving connections between said shaft and said piston; a pivot pin displaced from the axis of the crank shaft and revolving with said shaft; a member driven by said pin and arranged to swing about an axis fixed relatively to said cylinder and outside the orbit of said pivot, but close thereto, whereby said member is caused to swing with varying angular velocity as the crank shaft rotates uniformly; and driving connections between said swinging member and said valve sleeve.

11. The combination in a two cycle internal combustion engine of a cylinder; a piston; a reciprocable valve sleeve interposed between said cylinder and piston and controlling inlet and exhaust ports at opposite ends of the working space formed by said cylinder and piston; a crank shaft, driving connections between said shaft and said piston; a pivot pin displaced from the axis of the crank shaft and revolving with said shaft; a member driven by said pin and arranged to swing about an axis fixed relatively to said cylinder and outside the orbit of said pivot, but close thereto, whereby said member is caused to swing with varying angular velocity as the crank shaft rotates uniformly; and driving connections between said swinging member and said valve sleeve, the parts being so arranged that the valve sleeve attains approximately its maximum velocity relatively to the piston during the opening of the exhaust ports.

BERNHARD BISCHOF.